United States Patent
Kaiser

(10) Patent No.: US 6,454,841 B1
(45) Date of Patent: Sep. 24, 2002

(54) REFRIGERATOR AIR FILTRATION SYSTEM

(76) Inventor: Dolores Kaiser, 1219 Ashdy La., Hendersonville, NC (US) 28791

( * ) Notice: Subject to any disclaimer, the term of this patent is extended or adjusted under 35 U.S.C. 154(b) by 0 days.

(21) Appl. No.: 09/934,315

(22) Filed: Aug. 21, 2001

(51) Int. Cl.[7] ............................. F25F 3/16; B01D 46/10
(52) U.S. Cl. ........................ 96/224; 55/385.1; 55/487; 55/493; 62/440
(58) Field of Search .......................... 55/385.1, 385.4, 55/467, 487, 493; 96/224, 226; 422/121, 291; 62/440, 78

(56) References Cited

U.S. PATENT DOCUMENTS

| | | | |
|---|---|---|---|
| 2,811,840 A | * 11/1957 | Thompson | 126/299 R |
| 4,047,393 A | * 9/1977 | Hanson et al. | 62/428 |
| 5,078,971 A | * 1/1992 | Matuda et al. | 422/121 |
| 5,230,220 A | * 7/1993 | Kang et al. | 422/121 |
| 5,453,049 A | 9/1995 | Tillman, Jr. et al. | 454/228 |
| 5,501,084 A | * 3/1996 | Chang et al. | 62/264 |
| 5,568,730 A | * 10/1996 | Kim et al. | 422/123 |
| 5,772,959 A | * 6/1998 | Bermas | 422/1 |
| 5,837,207 A | 11/1998 | Summers | 422/121 |
| 5,893,939 A | 4/1999 | Rakocy et al. | 55/471 |
| 5,997,619 A | 12/1999 | Knuth et al. | 96/224 |
| 6,004,365 A | 12/1999 | Fiacco | 55/400 |
| 6,156,085 A | 12/2000 | Chiu et al. | 55/357 |
| 6,156,088 A | 12/2000 | Cardarelli | 55/385.8 |
| 6,286,330 B1 | * 9/2001 | Kopf | 62/314 |

FOREIGN PATENT DOCUMENTS

| | | | |
|---|---|---|---|
| JP | 05157444 A | * | 6/1993 |
| JP | 09243216 A | * | 9/1997 |
| JP | 11118326 A | * | 4/1999 |

* cited by examiner

Primary Examiner—David A. Simmons
Assistant Examiner—Frank M. Lawrence
(74) Attorney, Agent, or Firm—McHale & Slavin, P.A.

(57) ABSTRACT

The present invention describes a refrigerator air filtration system. The air filtration system includes a microfilter adapted for use within a refrigerator by cooperating with existing air handling means, or in conjunction with a provided air handling means, e.g. a fan. In a preferred embodiment, the filtration system is supplied as a kit which includes the necessary components for use within a plurality of refrigerators as are known in the art. Incorporation of the air filtration system is useful for enhancing food freshness and flavor and further aids in retarding food spoilage.

25 Claims, 2 Drawing Sheets

REFRIGERATOR AIR FILTRATION SYSTEM

FIELD OF THE INVENTION

The present invention relates to an apparatus for refrigerator air filtration; more particularly to an air purifying system particularly adapted to a refrigerator; and most particularly to an air filtration system constructed and arranged for cleaning the air within a refrigerator to eliminate harmful allergens and other particulates potentially affecting food storage.

BACKGROUND OF THE INVENTION

Several types of apparatus for filtering and cleaning air within a living space are known. As well, the use of microfilters for contaminant removal from either liquid or gaseous streams is well-known in the art. Removal of common allergens tend to be targeted specifically within the indoor air of the home. Little, if any, attention is typically directed toward modifying the air quality within a refrigerator. Various organisms such as mold spores are commonly suspended in the air along with bacteria, viruses, and other small particles unable to be trapped in average filters. If left untreated, the air within the confines of a refrigerator will proliferate these organisms, accelerate food spoilage, and denigrate the taste and aroma of certain foods.

Thus, if an effective air filtering device, specially suited for filtering refrigerator air, could be provided for removing potentially harmful components from the air within a refrigerator, a long-felt need would be realized.

DESCRIPTION OF THE PRIOR ART

U.S. Pat. No. 5,997,619 issued to Knuth et al discloses a self-contained air movement system having a housing unit. Air is circulated through the housing unit by a fan. The air enters an inlet, is circulated through a germicidal unit, a filter unit, and out an outlet. The germicidal unit is an ultraviolet irradiation means. Claim 12 defines the filter as a HEPA filter. Claim 7 claims a carbon mesh discharge filter which is added in addition to the HEPA filter to absorb residual odors from the unit. The fan is run by a motor with the source of electricity being an electrical outlet. The portable unit is designed for small rooms. The patent fails to contemplate treating air within a refrigerator.

U.S. Pat No. 5,837,207 issued to Summers discloses a germicidal air purifier that is portable having a cabinet with an area for admitting air and an area for exhausting filtered air, a planar filter medium, and a means for moving air to be filtered. Claim 23 claims a fan as the means for moving the air. Claim 8 claims a pleated paper medium for filtering the air. Ultraviolet radiation is essential for function. The patent fails to contemplate treating air within a refrigerator.

U.S. Pat. No. 5,453,049 issued to Tillman, Jr., et al teaches a room air filter comprising a triangular housing unit with a high efficiency particulate air (HEPA) filter and a fan assembly. The specification discloses the use of HEPA filters and ULPA filters. The fan assembly is disclosed as a circulating fan including centrifugal, axial, or plenum type. The unit may be adapted to be mounted to a wall corner. The patent fails to contemplate treating air within a refrigerator.

U.S. Pat. Nos. 6,156,088; 6,156,085; 6,004,365; and 5,893,939 disclose air filters with variations on the basic idea of a housing unit with an air inlet, air outlet, fan and filter. In each patent, the air is circulated through the filter, housed within the unit, by the fan. U.S. Pat. No. 6,156,085 issued to Chiu et al specifically claims an air cleaner that is portable. U.S. Pat. No. 6,156,088 issued to Cardarelli describes an ashtray in the shape of a flower arrangement with features to pull in smoke-filled air. U.S. Pat. No. 6,004,365 issued to Fiacco is specially suited for use in conjunction with a room ceiling fan. U.S. Pat. No. 5,893,939 issued to Rakocy et al includes a compressible, resilient gasket adjoining a substantially vertical wall of the base assembly. None of these patents contemplate treating air within a refrigerator.

SUMMARY OF THE INVENTION

The present invention is directed toward filtering air within an appliance such as a refrigerator, particularly through the use of a microfilter having a pore size sufficient for removing bacteria and other minute particulates which may be down to $1\,\mu$ or less, for a residential or commercial refrigerator. The microfilter can function in conjunction with the refrigerator's integral fan to rid the refrigerator air of airborne particulates illustrated by, but not limited to, mold spores, bacteria, and viruses. In an alternative embodiment, a means effective to produce airflow between the interior air inlet and an interior air outlet of a plenum chamber, such as a fan, is provided in conjunction with the filter. A means for driving the manner in which airflow is produced is also provided. Such means may include an adapter for deriving electricity, e.g. via the electric socket for the ice-maker or light bulb found within most refrigerators, power by battery, or other means by which the cooling device is powered. In a further embodiment, a radiant disinfection means, such as an ultraviolet (UV) lamp, is incorporated within the housing to disinfect the air drawn through the filtration system.

Accordingly, it is an objective of the instant invention to provide a microfilter adapted to clean the air within a refrigerator.

It is a further objective of the instant invention to provide an apparatus to further aid in disinfecting the air within a refrigerator.

It is yet another objective of the instant invention to provide a safe, simple, and reliable manner to rid refrigerator air of any hazardous microorganisms contained within the appliance.

It is a still further objective of the instant invention to provide a kit for converting an existing refrigerator so as to easily provide internal air filtration capabilities.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

The air filtration system of the present invention has the capability to clean the air within a refrigerator, accomplished particularly through the use of a microfilter. A microfilter has micropores permeable to air and oxygen and provides the ability to filter out fine particles such as bacteria and other microorganisms and airborne pollutants. Microfilters can be constructed of a variety of materials which can be of a woven or non-woven material. An example of a common filter material is polypropylene. Microfilter foils have also been employed for cross flow filtration needs. HEPA filters are also quite effective in particulate removal such as mold spores and pollen with a filtration rating approximately to 0.3 $\mu$.

A potential problem faced within the variably humid environment of a refrigerator is that a buildup of moisture can restrict porosity of a filter, particularly the fine pores of a microfilter. Use of a pre-filter or water repellent pad may therefore be indicated. Depending on the choice of materials, the filters will either need to be periodically replaced or properly cleaned, such as with a mild soap and water or in a dishwasher, and dried for reuse.

As time passes, an air filter may hold bacteria potentially capable of growing on the surface of the filter material. An additional contemplated embodiment of the present invention includes a filter media having bactericidal properties which may be molded within a polymer.

The air filter or filters remain in place with the aid of various support means which may be provided as part of the air filter assembly of the plenum chamber. In a further embodiment, best illustrated in FIG. 3, 3A, or 3B, the support means for the filter or filters may not be attached to a plenum chamber. By way of example, a fitted, or insertable, frame is employed in which the filters may be inserted to easily slide in and out as desired. One or more brackets can also be used for support by coupling the bracket(s) to an interior area of a refrigerator in combination with a frame. Additionally, a type of adhesive on the outside portion of the filter or frame may be utilized. Several filters may be serially arranged with respect to pore size in order to satisfy particular uses and/or needs within a refrigerator. By way of example a series of filters arranged with respect to decreasing pore size may be useful to postpone the life of a microfilter by trapping a larger particulate within a first filter, whereas a smaller particulate may pass through one or more filters before becoming trapped within a microfilter having a pore size sufficient to capture that smaller particulate.

Figure 1:
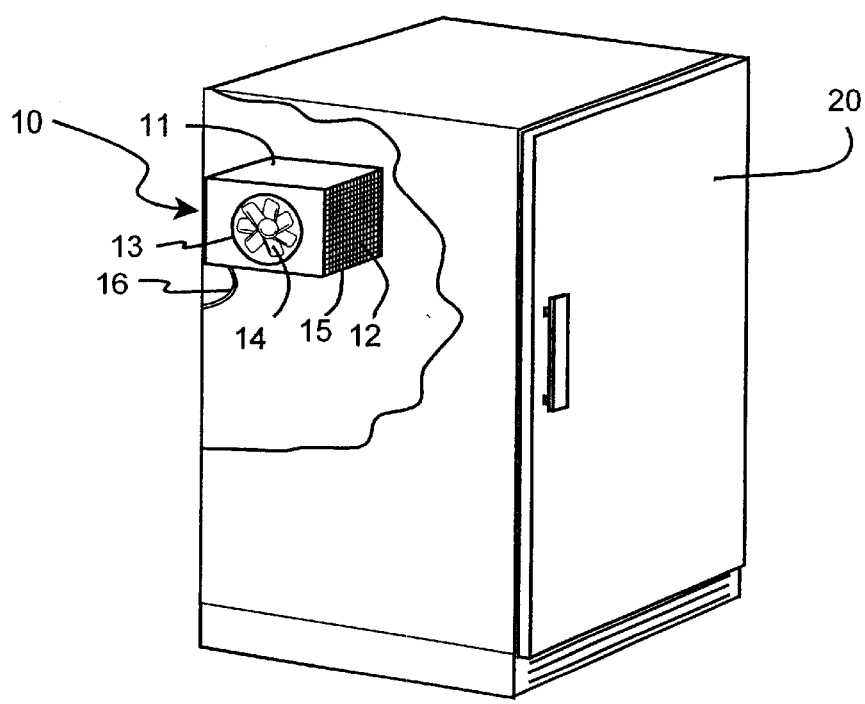
FIG. 1 is a side view of a filtration apparatus positioned within the interior of a refrigerator.

Referring to the drawings in more detail, FIG. 1 demonstrates an air filtration means within a refrigerator 20 such as for commercial or residential use. Located within the partially vented housing, essentially a plenum chamber 11, is the means effective to produce airflow, illustrated by, but not limited to, a fan 14, and an air filter assembly comprising a filter or plurality of filters 12. Although FIG. 1 shows the plenum chamber within the interior airspace of a refrigerator 20, it is for illustrative purposes and does not limit the contemplated invention. The plenum chamber 11 provides integral attachment means for the components such as for the support of an air filter assembly and attachment to a wall 10 or walls of a refrigerator 20. The means for support for the filter or filters may be an insertable frame, adhesive, or the like. By way of example, a microfilter with a pore size up to about 1 $\mu$, which can be utilized an any of the embodiments of the instant invention, is positioned within an insertable frame as part of an air filter assembly supported within a plenum chamber that is attached or in communication with the interior airspace, such as the interior walls, of a refrigerator.

As illustrated, the plenum chamber 11 is in fluid communication with an interior airspace of a refrigerator, and may comprise an elongated housing having an axis corresponding to the path of air flow with the air flow following the axis. The air movement flows into the air-permeable wall, or interior air inlet 15 opening, of the chamber, downstream through an air filter assembly containing the filter or filters 12, past the fan (air movement means) 14, and back out through a second air-permeable wall, or interior air outlet 13 opening, of the chamber. The interior air inlet 15 opening and interior air outlet 13 opening may or may not be axially aligned. In a non-limiting embodiment, the apparatus is positioned wholly within the interior airspace of the refrigerator 20. Alternatively, the existing air handling means of the appliance can be utilized, wherein the filter is positioned over a vent for the fan. The air is pulled through the filter, past the fan, and along the factory installed means for circulating air. On the contrary, the air travels through the air handling means and past the filter as it re-enters the refrigerator interior or interior airspace, such option being determined by the user or dictated by the availability of a vent communicating with the interior of the refrigerator. In an alternative embodiment, the plenum chamber may be integrally attached to or molded within a refrigerator design as it is manufactured. In a further embodiment, a radiant disinfection means 17, best illustrated in FIG. 2, such as an ultraviolet lamp, which produces ozone naturally through its UV light rays, may be positioned upstream of the air filter or filters to disinfect the air as it passes through the chamber. A means for energizing the lamp would also be included.

Figure 2:
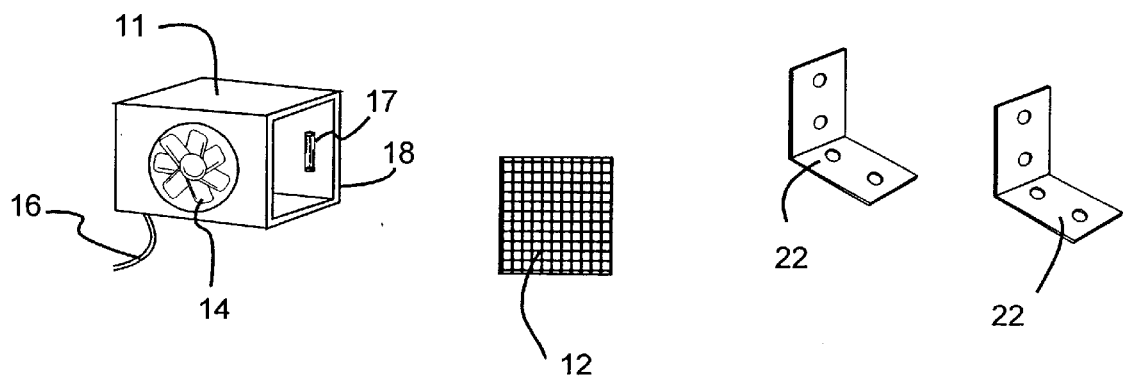
FIG. 2 is a perspective view showing the components of a refrigerator air filtration conversion kit.

Referring to FIG. 2, a kit containing all necessary components offers an end-user the option of installing the filter system in an existing refrigerator. Such a kit may include a plenum chamber 11, in fluid communication with an interior airspace, for the components, an air filter assembly, to be positioned upstream of the air flow producing means, adapted to support at least one filter element and subsequent mounting means for attachment support, or positioning, within the interior, for example employing at least one bracket 22 for support to an interior wall, or interior airspace comprising an insertable filter element such as a microfilter 12, an air filter support 18, either integral or distinct, such as an insertable frame, means for supporting the plenum chamber, i.e. brackets 22 which may be coupled to an interior air opening, or a type of adhesive, means for producing airflow between the interior air inlet and interior air outlet, such as a fan 14, and means, either independent or dependent sources, such as an adapter, for deriving power 16 to the means effective for producing airflow. In an further embodiment, a means for radiant disinfection 17 such as a UV lamp may be included with a means for energizing said radiant disinfection means.

Figure 3:
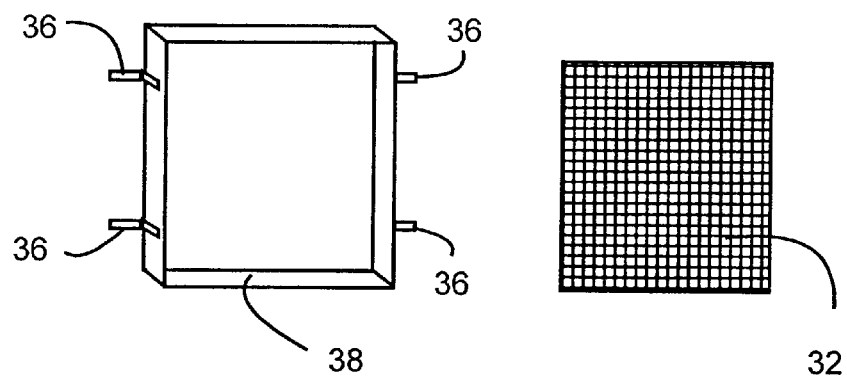
FIG. 3 is a perspective view illustrating an alternative refrigerator air filtration kit.
Figure 3A:
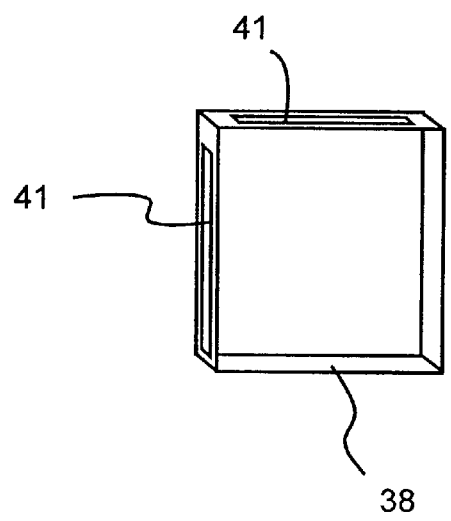
FIG. 3A is a perspective view illustrating a simplified refrigerator air filtration kit.
Figure 3B:
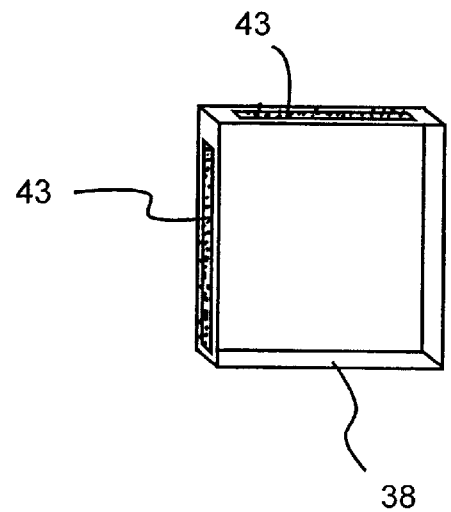
FIG. 3B is a perspective view illustrating an alternative simplified refrigerator air filtration kit.

Alternatively, as in FIG. 3, a plurality of filter elements may be provided with appropriate means of support for attachment to the plenum chamber or to be placed over a vent in fluid communication with the interior airspace of a refrigerator to cooperate with the existing fan structure of the refrigerator. Also included may be mounting means for positioning, or attaching, the air filter assembly in fluid communication with the interior airspace of a refrigerator. Such mounting means may include at least one attachable bracket 22, insertable frames 38, or the like for inserting filters 12, adhesive 36, double-stick tape 41, as illustrated in FIG. 3A, velcro 43, as illustrated in FIG. 3B, or the like.

An additional contemplated embodiment of the present invention includes utilizing an air permeable membrane, or filter with media, providing bactericidal properties molded within the polymer. Any of the above embodiments may employ this type of filter.

This type of air filtration apparatus could be applied within a variety of storage containers where the freshness of the contents, food or otherwise, are of a concern.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An air filtration apparatus for a refrigerator comprising:
    a plenum chamber in fluid communication with an interior airspace of a refrigerator, said plenum chamber having an interior air inlet and an interior air outlet, said plenum chamber further including radiant disinfection means positioned upstream of an air filter whereby air flowing through said plenum chamber is disinfected thereby wherein said radiant disinfection means is an ultraviolet lamp including a means for energizing said ultraviolet lamp;
    a means effective to produce airflow between said interior air inlet and said interior air outlet;
    an air filter assembly including at least one air filter positioned upstream of said airflow producing means, said air filter assembly comprising an air permeable membrane having a pore size up to about 1 $\mu$; and,
    a means for supporting said air filter assembly in said upstream position.

2. An apparatus as in claim 1, wherein said plenum chamber is positioned within said interior airspace.

3. An apparatus as in claim 1, wherein said interior air inlet and said interior air outlet are axially aligned.

4. An apparatus as in claim 1, wherein said means for supporting said air filter assembly is an insertable frame.

5. An apparatus as in claim 1, wherein said air filter assembly comprises a microfilter.

6. An apparatus as in claim 1, wherein said air filter assembly comprises an air permeable membrane having bactericidal properties.

7. An apparatus as in claim 1, wherein said air filter assembly comprises a plurality of air filters.

8. An apparatus as in claim 7, wherein said plurality of air filters are serially arranged with respect to decreasing pore size.

9. A refrigerator having an air filter system comprising:
    a plenum chamber, in fluid communication with an interior airspace of said refrigerator, said plenum chamber having an interior air inlet and an interior air outlet, wherein said plenum chamber is integrally attached to said refrigerator, said plenum chamber further including radiant disinfection means positioned upstream of an air filter whereby air flowing through said plenum chamber is disinfected thereby wherein said radiant disinfection means is an ultraviolet lamp including a means for energizing said ultraviolet lamp;
    a means effective to produce airflow between said interior air inlet and said interior air outlet;
    an air filter assembly including at least one air filter positioned upstream of said airflow producing means wherein said air filter assembly comprises an air permeable membrane having a pore size up to about 1 $\mu$; and,
    a means for supporting said air filter in said upstream position.

10. The refrigerator having an air filter system according to claim 9, wherein said plenum chamber is positioned within said interior airspace.

11. The refrigerator having an air filter system according to claim 9, wherein said interior air inlet and said interior air outlet are axially aligned.

12. The refrigerator having an air filter system according to claim 9, wherein said means for supporting said air filter assembly is an insertable frame.

13. The refrigerator having an air filter system according to claim 9, wherein said air filter assembly comprises a microfilter.

14. The refrigerator having an air filter system according to claim 9, wherein said air filter assembly comprises an air permeable membrane having bactericidal properties.

15. The refrigerator having an air filter system according to claim 9, wherein said air filter assembly comprises a plurality of air filters.

16. An apparatus as in claim 15, wherein said plurality of air filters are serially arranged with respect to decreasing pore size.

17. A refrigerator air filtration kit, comprising:
    a plenum chamber in fluid communication with an interior airspace of a refrigerator, said plenum chamber having an interior air inlet and an interior air outlet, said plenum chamber further including radiant disinfection means positioned upstream an air filter whereby air flowing through said plenum chamber is disinfected thereby wherein said radiant disinfection means is an ultraviolet lamp including a means for energizing said ultraviolet lamp;
    a means for attaching said plenum chamber to at least one interior wall of said refrigerator;
    a means effective to produce airflow between said interior air inlet and said interior air outlet;
    an air filter assembly adapted to support at least one filter element therein wherein said air filter assembly comprises an air permeable membrane having a pore size up to about 1 $\mu$, said air filter assembly including at least one air filter positioned upstream of said airflow producing means; and, mounting means for positioning said air filter assembly in fluid communication with an interior airspace of a refrigerator; and, a means for supporting said air filter in said upstream position.

18. The refrigerator air filtration kit of claim 17, wherein said mounting means is a filter insertable frame.

19. The refrigerator air filtration kit according to claim 18, wherein said frame includes an adhesive.

20. The refrigerator air filtration kit of claim 17, wherein said mounting means is at least one bracket coupled to an interior air opening.

21. The refrigerator air filtration kit of claim 17, wherein said air filter assembly comprises a microfilter.

22. The refrigerator air filtration kit of claim 17, wherein said air filter assembly comprises an air permeable membrane having bactericidal properties.

23. The refrigerator air filtration kit of claim 17, wherein said air filter assembly comprises a plurality of air filters.

24. The refrigerator air filtration kit of claim 23, wherein said plurality of air filters are serially arranged with respect to decreasing pore size.

25. The refrigerator air filtration kit according to claim 17, wherein said means for attaching said plenum chamber is at least one bracket.

* * * * *